(12) United States Patent
Park et al.

(10) Patent No.: US 10,151,602 B2
(45) Date of Patent: Dec. 11, 2018

(54) ELECTRONIC DEVICE AND METHOD FOR CALIBRATING GYRO SENSOR THEREOF

(71) Applicant: Samsung Electronics Co., Ltd., Gyeonggi-do (KR)

(72) Inventors: Chan Hyoung Park, Gyeonggi-do (KR); Jung Won Suh, Gyeonggi-do (KR); Jeong Min Park, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 228 days.

(21) Appl. No.: 15/041,378

(22) Filed: Feb. 11, 2016

(65) Prior Publication Data

US 2016/0252366 A1    Sep. 1, 2016

(30) Foreign Application Priority Data

Feb. 26, 2015 (KR) .................. 10-2015-0026994

(51) Int. Cl.
*G01C 25/00* (2006.01)
*G01P 21/00* (2006.01)

(52) U.S. Cl.
CPC ............ *G01C 25/005* (2013.01); *G01P 21/00* (2013.01)

(58) Field of Classification Search
CPC ............................. G01C 23/005; G01P 21/00
See application file for complete search history.

(56) References Cited

U.S. PATENT DOCUMENTS

| | | | | |
|---|---|---|---|---|
| 8,972,180 | B1* | 3/2015 | Zhao | G01C 21/165 |
| | | | | 701/468 |
| 9,534,924 | B2* | 1/2017 | Ahuja | G01C 25/00 |
| 9,546,883 | B2* | 1/2017 | Ahuja | G01C 25/00 |
| 9,581,466 | B2* | 2/2017 | Ahuja | G01C 25/00 |
| 9,594,095 | B2* | 3/2017 | Bhandari | G01P 21/00 |
| 2003/0145644 | A1* | 8/2003 | Rabbett | G01N 27/4163 |
| | | | | 73/1.06 |
| 2007/0250261 | A1* | 10/2007 | Soehren | G01C 21/16 |
| | | | | 701/510 |
| 2010/0280783 | A1* | 11/2010 | Streibel | G01P 21/00 |
| | | | | 702/104 |
| 2011/0098921 | A1* | 4/2011 | Miller | G01C 21/16 |
| | | | | 701/408 |
| 2011/0259078 | A1 | 10/2011 | Caron | |
| 2013/0121367 | A1* | 5/2013 | Ahuja | G01C 25/00 |
| | | | | 374/1 |
| 2013/0124126 | A1* | 5/2013 | Ahuja | G01C 25/00 |
| | | | | 702/85 |
| 2013/0124127 | A1* | 5/2013 | Ahuja | G01C 25/00 |
| | | | | 702/86 |

(Continued)

*Primary Examiner* — David A Rogers
(74) *Attorney, Agent, or Firm* — Cha & Reiter, LLC.

(57) ABSTRACT

An electronic device and method for calibrating a gyro sensor thereof is disclosed. The electronic device includes an acceleration sensor configured to measure an acceleration of the electronic device, a gyro sensor configured to measure an angular velocity of the electronic device, and a sensor control module configured to set a calibration period of the gyro sensor based on a state of the electronic device, to determine a stop state of the electronic device using the acceleration sensor if the set calibration period arrives, and to calibrate the gyro sensor if the electronic device is determined to be at a stop state.

20 Claims, 9 Drawing Sheets

(56) References Cited

U.S. PATENT DOCUMENTS

| | | | |
|---|---|---|---|
| 2013/0218505 A1* | 8/2013 | Bhandari | G01P 21/00 702/104 |
| 2014/0012531 A1* | 1/2014 | Bhandari | G01P 21/00 702/104 |
| 2017/0168086 A1* | 6/2017 | Gafforelli | G01P 15/125 |

* cited by examiner

ELECTRONIC DEVICE AND METHOD FOR CALIBRATING GYRO SENSOR THEREOF

CLAIM OF PRIORITY

This application claims the benefit of priority under 35 U.S.C. § 119(a) from a Korean patent application filed on Feb. 26, 2015 in the Korean Intellectual Property Office and assigned Serial number 10-2015-0026994, the entire disclosure of which is hereby incorporated by reference in its entirety.

TECHNICAL FIELD

The present disclosure relates to an electronic device and a method for calibrating a gyro sensor thereof.

BACKGROUND

Various electronic devices are being developed as electronic technologies advance. Portable electronic devices such as smartphones, tablet PCs, and the like are widely used, as they may provide various services such as shooting images, music play, video play, e-mail, social networking service (SNS), map services, navigation, bus guide, subway guide, and the like, An electronic device may be equipped with various kinds of sensors to support the above-described services. In particular, an acceleration sensor and a gyro sensor may be used for various services such as shooting images, navigation, map services, and the like.

The gyro sensor is generally calibrated only in the manufacturing process. Errors typically occur in the gyro sensor due to drift. Errors caused by drift may increase the processing time of the electronic device. In the case where calibration is continuously performed to correct errors in the gyro sensor, battery current is consumed due to constant activation of the gyro sensor.

SUMMARY

An aspect of the present disclosure is to address at least some of the above-mentioned problems and/or disadvantages and to provide at least the advantages described below.

Accordingly, an aspect of the present disclosure is to provide an electronic device which outputs an accurate sensor value by correcting an error of a gyro sensor occurring over time and to minimize current consumption according to a calibration process of the gyro sensor and a method for calibrating the gyro sensor.

In accordance with an aspect of the present disclosure, an electronic device is provided. The electronic device may include an acceleration sensor configured to measure an acceleration of the electronic device, a gyro sensor configured to measure an angular velocity of the electronic device, and a sensor control module configured to set a calibration period of the gyro sensor based on a state of the electronic device, to determine a stop state of the electronic device using the acceleration sensor if the set calibration period arrives, and to calibrate the gyro sensor if the electronic device is determined to be at a stop state.

In accordance with another aspect of the present disclosure, an operating method of an electronic device may include setting a calibration period of a gyro sensor based on a state of the electronic device, determining a stop state of the electronic device using an acceleration sensor if the set calibration period arrives, and calibrating the gyro sensor if the electronic device is determined to be at a stop state.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will become more apparent to the person of ordinary skill in the art from the following description taken in conjunction with the accompanying drawings, in which.

Throughout the drawings, it should be noted that like reference numbers are used to depict the same or similar elements, features, and structures.

DETAILED DESCRIPTION

Figure 1:
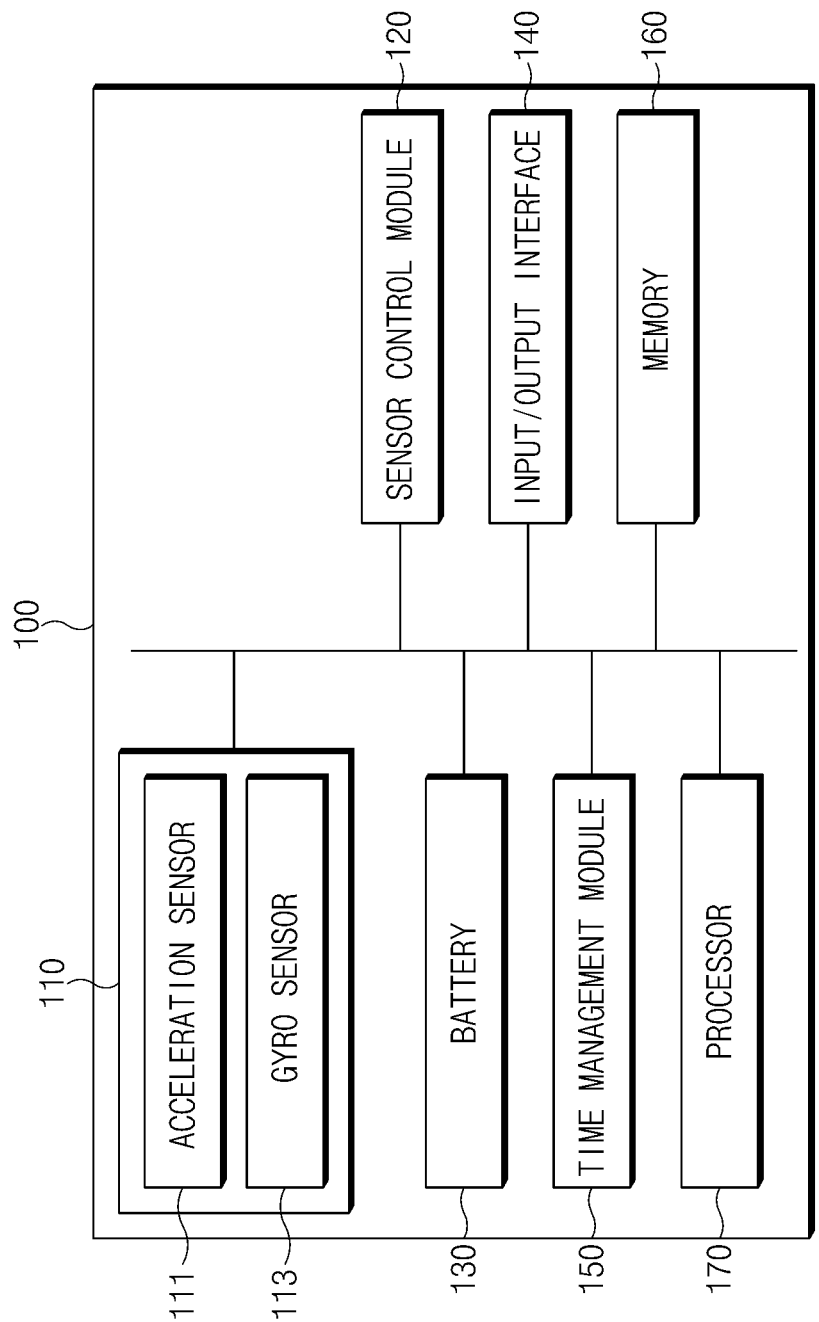
FIG. 1 is a block diagram illustrating one possible configuration of an electronic device according to various embodiments of the present disclosure.

Various embodiments of the present disclosure may be described with reference to accompanying drawings. Accordingly, those of ordinary skill in the art will recognize that modifications, equivalents, and/or alternatives of the various embodiments described herein can be made without departing from the scope and spirit of the present disclosure. With regard to the description of the drawings, similar components may be marked with similar reference numerals.

In the present disclosure, the expressions "have", "may have", "include" and "comprise", or "may include" and "may comprise" indicate the existence of corresponding features (e.g., elements such as numeric values, functions, operations, or components) but do not exclude the presence of additional features.

In the present disclosure, the expressions "A or B", "at least one of A and/or B", or "one or more of A and/or B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms do not limit the order and/or priority of the elements. Furthermore, such terms may be used to distinguish one element from another element. For example, "a first user device" and "a second user device" may indicate different user devices. In addition, without departing from the scope of the present disclosure, a first element may be referred to as a second element, and similarly, a second element may be referred to as a first element.

It will be understood by a person of ordinary skill in the art that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there is no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal sense unless expressly so defined herein in various embodiments of the present disclosure. In some cases, even if terms are terms, which are defined in the specification, they may not be interpreted to exclude embodiments of the present disclosure.

An electronic device according to various embodiments of the present disclosure may include at least one of smartphones, tablets, personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices.

According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or an implantable type (e.g., an implantable circuit).

According to various embodiments of the present disclosure, the electronic devices may be smart home appliances. The smart home appliances may include at least one of, for example, televisions (TVs), digital versatile disc (DVD) players, audios, refrigerators, air conditioners, cleaners, ovens, microwave ovens, washing machines, air cleaners, set-top boxes, TV boxes (e.g., Samsung HomeSync™, Apple TV™, or Google TV™), game consoles (e.g., Xbox™ and PlayStation™), electronic dictionaries, electronic keys, camcorders, electronic picture frames, and the like.

According to various embodiments of the present disclosure, the electronic devices may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices receiving a user input in an idle mode, navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to a certain embodiment of the present disclosure, the electronic devices may include at least one of furniture or buildings/structures, electronic boards, electronic signature receiving devices, projectors, or various measuring instruments (e.g., water meters, electricity meters, gas meters, or wave meters, and the like). The electronic devices according to an embodiment of the present disclosure may be one or more combinations of the above-mentioned devices.

According to a certain embodiment of the present disclosure, an electronic device may be a flexible electronic. Also, electronic devices according to various embodiments of the present disclosure are not limited to the above-mentioned devices, and may include new electronic devices according to technology development.

Hereinafter, electronic devices according to an embodiment of the present disclosure will be described with reference to the accompanying drawings. The term "user" used herein may refer to a person who uses an electronic device or may refer to a device (e.g., an artificial electronic device) that uses an electronic device.

FIG. 1 is a block diagram illustrating a configuration of an electronic device according to various embodiments of the present disclosure.

Referring to FIG. 1, an electronic device 100 may include a sensor module 110, a sensor control module 120, a battery 130, an input/output interface 140, a time management module 150, a memory 160, and a processor 170.

According to an embodiment, the sensor module 110 may include an acceleration sensor 111 and a gyro sensor 113.

The acceleration sensor 111 may sense an acceleration of the electronic device 100. For example, the acceleration sensor 111 may sense the acceleration of the electronic device 100 and may output an acceleration value of the electronic device 100 in a three-axis (e.g., x, y, and z) direction. The gyro sensor 113 may sense an angular velocity of the electronic device 100. For example, the gyro sensor 113 may sense the angular velocity of the electronic device 100 and may output an angular velocity of the electronic device 100 in a three-axis (e.g., x, y, and z) direction.

The sensor control module 120 may control the sensor module 110. According to an embodiment, the sensor control module 120 may be a low-power processor of which the power consumption is smaller than that of the processor 170. Alternatively, the sensor control module 120 may be included in the processor 170. According to an embodiment, the sensor control module 120 may activate or inactivate the sensor module 110. For example, in the case where information (e.g., an acceleration and/or an angular velocity) about a movement of the electronic device 100 is required according to an operation of an application, the sensor control module 120 may activate the acceleration sensor 111 and/or the gyro sensor 113 so as to sense the acceleration and/or the angular velocity. As another example, in the case where information (e.g., an acceleration and/or an angular velocity) about a movement of the electronic device 100 is not required, the sensor control module 120 may inactivate the acceleration sensor 111 and/or the gyro sensor 113. An active state may mean a state in which the acceleration sensor 111 and the gyro sensor 113 sense the acceleration and the angular velocity respectively and output sensing values. An inactive state may mean a state in which the acceleration sensor 111 and the gyro sensor 113 do not operate or do not output sensing values. According to an embodiment, the sensor control module 120 may independently activate or inactivate sensors (e.g., the acceleration sensor 111 and/or the gyro sensor 113) included in the sensor module 110.

According to various embodiments of the present disclosure, the sensor control module 120 may set a calibration period of the gyro sensor 113 based on a state of the electronic device 100. For example, the sensor control module 120 may set the calibration period of the gyro sensor 113, based on at least one of an active state of the gyro sensor 113, a charging state of the electronic device 100, a connection state with a specific external device, and/or an execution state of a specific application.

According to an embodiment, the sensor control module 120 may determine whether the gyro sensor 113 is activated. According to an embodiment, the sensor control module 120 may set a calibration period of the gyro sensor 113 to be different according to whether the gyro sensor 113 is activated. For example, if the gyro sensor 113 is at an inactive state, the sensor control module 120 may set the calibration period to a first time interval (e.g., 10 minutes); if the gyro sensor 113 is at an active state, the sensor control module 120 may set the calibration period to a second time interval (e.g., 2 minutes) shorter than the first time interval. In the case where the gyro sensor 113 is activated (e.g., in the case where the gyro sensor 113 is used for camera, map, augmented reality or game execution), a current may be consumed due to the use of the gyro sensor 113. In this case, the calibration period may be set to be short such that calibration is frequently performed. In the case where the gyro sensor 113 is inactivated, the calibration period may be set to be long, thereby reducing current consumption.

According to an embodiment, the sensor control module 120 may determine whether the battery 130 is being charged. For example, the sensor control module 120 may receive information about a charging state of the battery 130 from the processor 170 and may determine whether the battery 130 is being charged, based on the received information. According to an embodiment, the battery 130 may be charged in a wireless charging manner, such as magnetic resonance or magnetic induction, as well as a wired charging manner. According to an embodiment, the sensor control module 120 may set a calibration period of the gyro sensor 130 to be different according to whether the battery 113 is being charged. For example, if the battery 130 is not being charged (or the battery 130 is being discharged), the sensor control module 120 may set the calibration period to the first time interval (e.g., 10 minutes); if the battery 130 is being charged, the sensor control module 120 may set the calibration period to a third time interval (e.g., one minute) shorter than the first time interval. The calibration period may be set to a shorter time interval because current consumption is not an issue while the electronic device 100 is being charged.

According to an embodiment, the sensor control module 120 may determine whether a specific external device is connected to the input/output interface 140. For example, the sensor control module 120 may receive information about an external device, connected to the input/output interface 140, from the processor 170 or the input/output interface 140 and may determine whether a specific external device is connected to the input/output interface 140, based on the received information. As another example, the sensor control module 120 may receive information about whether an external device is connected to the input/output interface 140, from the processor 170 and may determine whether the specific external device is connected to the input/output interface 140, based on the received information. The specific external device may be an audio dock, which is connected with the electronic device 100, fixedly supported, and replays an audio signal received from the electronic device 100. According to an embodiment, the sensor control module 120 may set a calibration period of the gyro sensor 130 to be different according to whether a specific external device is connected to the input/output interface 140. For example, if the specific external device is not connected with the input/output interface 140, the sensor control module 120 may set the calibration period to the first time interval (e.g., 10 minutes); if the specific external device is connected with the input/output interface 140, the sensor control module 120 may set the calibration period to a fourth time interval (e.g., 5 minutes) shorter than the first time interval. The probability that the electronic device 100 is at a stop state when the electronic device 100 is connected with a fixedly supported external device may be high, and thus the calibration period may be set to a shorter time interval such that the gyro sensor 113 is efficiently calibrated.

According to an embodiment, the sensor control module 120 may determine whether a specific application is running. For example, the sensor control module 120 may receive information associated with execution of an application from the processor 170 and may determine whether a specific application (e.g., a heartbeat measuring application or a camera application) is running. According to an embodiment, the sensor control module 120 may set a calibration period of the gyro sensor 130 to be different according to whether the specific application is running. For example, if the specific application is not running, the sensor control module 120 may set the calibration period to the first time interval (e.g., 10 minutes); if the specific application is running, the sensor control module 120 may set the calibration period to a seventh time interval (e.g., 3 minutes) shorter than the first time interval.

According to the above-described embodiments, current consumption may be minimized by setting a calibration period of the gyro sensor 113 based on a state of the electronic device 100, and thus the gyro sensor 113 may be efficiently calibrated.

According to an embodiment, the sensor control module 120 may set the calibration period of the gyro sensor 113, based on a priority given to a state of the electronic device 100 such as a charging state of the electronic device 100, a connection state with a specific external device, and an execution state of a specific application. Priorities about states of the electronic device 100 may be set according to the following order: a state where the electronic device 100 is being charged>a state where the electronic device 100 (or the input/output interface 140) is connected with a specific external device>a state where a specific application is running>a state where the gyro sensor 113 is activated>other states (e.g., a state where the electronic device 100 is not being charged, a state where the electronic device 100 is not connected with a specific external device, a state where a specific application is not running, and a state where the gyro sensor 113 is inactivated). For example, if the electronic device 100 is being charged with the gyro sensor 113 activated, the sensor control module 120 may set the calibration period (e.g., the second time interval) based on the above-described priorities such that the electronic device 100 corresponds to a charging state.

According to an embodiment, if the calibration period is set, the sensor control module 120 may determine whether the set calibration period arrives. For example, the sensor control module 120 may set a timer corresponding to the calibration period in the time management module 150 and may determine whether the calibration period arrives. The sensor control module 120 may include the time management module 150.

According to an embodiment, if the calibration period arrives, the sensor control module 120 may determine whether the electronic device 100 is at a stop state, using the acceleration sensor 111. For example, if only a sensing value corresponding to an acceleration of gravity in a specific direction is outputted from the acceleration sensor 111, the sensor control module 120 may determine the electronic device 100 as being at a stop state. As another example, if an acceleration value outputted from the acceleration sensor 111 is constantly maintained, the sensor control module 120 may determine the electronic device 100 as being at a stop state. According to an embodiment, in the case where the calibration period arrives with the acceleration sensor 111 inactivated, the sensor control module 120 may activate the acceleration sensor 113 and may determine whether the electronic device 100 is at a stop state.

According to an embodiment, the sensor control module 120 may determine a stop state of the electronic device 100 during a specific time (e.g., 10 seconds) using the acceleration sensor 111. According to an embodiment, if the electronic device 100 is not at the stop state during the specific time, the sensor control module 120 may wait until a next calibration period arrives.

According to an embodiment, the sensor control module 120 may calibrate the gyro sensor 113 if the electronic device 100 is determined to be at the stop state. According to an embodiment, the sensor control module 120 may calculate an offset value of the gyro sensor 113 if the electronic device 100 is at the stop state. According to an embodiment, the sensor control module 120 may obtain an angular velocity value by correcting an output value of the gyro sensor 113 using the calculated offset value.

According to an embodiment, if the electronic device 100 is determined to be at the stop state with the gyro sensor 113 inactivated, the sensor control module 120 may activate the gyro sensor 113 and may calibrate the gyro sensor 113.

According to an embodiment, the sensor control module 120 is able to calibrate the gyro sensor 113 without determining whether the electronic device 100 is at a stop state, based on a state of the electronic device 100. For example, if the electronic device 100 is connected with a specific external device (e.g., an audio dock) or the electronic device 100 is being charged using a wireless manner or a magnetic induction manner, the sensor control module 120 may skip a process of determining whether the electronic device 100 is at a stop state, based on a state of the electronic device 100. That is, in the case where the probability that the electronic device 100 is at a stop state is very high, the sensor control module 120 may skip a process of determining whether the electronic device 100 is at a stop state.

According to an embodiment, the sensor control module 120 may determine a stop state of the electronic device 100 based on an execution state of an application, regardless of the calibration period of the gyro sensor 113, and may calibrate the gyro sensor 113. For example, if an image is captured by a camera application, the sensor control module 120 may determine a stop state of the electronic device 100 and may calibrate the gyro sensor 113. As another embodiment, if a user's heartbeat is measured through a heartbeat measuring application, the sensor control module 120 may determine a stop state of the electronic device 100 and may calibrate the gyro sensor 113.

According to an embodiment, if the calibration of the gyro sensor 113 is completed, the sensor control module 120 may set the calibration period of the gyro sensor 113 to a fifth time interval (e.g., two hours) longer than a current calibration period (e.g., one of the first time interval to the fourth time interval).

According to an embodiment, the sensor control module 120 may set the calibration period of the gyro sensor 113 based on a time, which elapses after the calibration of the gyro sensor 113 is completed. For example, if a specific time elapses after the calibration of the gyro sensor 113 is completed, the sensor control module 120 may set the calibration period to a sixth time interval (e.g., one hour) shorter than the fifth time interval. For example, if a specific time (e.g., 24 hours) elapses after the calibration of the gyro sensor 113 is completed, the sensor control module 120 may set the calibration period to one of the first time interval to the fourth time interval. In another embodiment, as a time elapsing, after the calibration of the gyro sensor 113, becomes longer, the sensor control module 120 may set the calibration period of the gyro sensor 113 to a shorter time interval. According to an embodiment, if 24 hours elapse after the calibration of the gyro sensor 113 is completed, the sensor control module 120 may set the calibration period of the gyro sensor 113 to one hour; if 72 hours elapse after the calibration of the gyro sensor 113 is completed, the sensor control module 120 may set the calibration period of the gyro sensor 113 to 30 minutes.

According to an embodiment, if the calibration of the gyro sensor 113 is completed, the sensor control module 120 may store a calibration result (or an offset value) in the memory 160. According to an embodiment, if the electronic device 100 is rebooted, the electronic device 100 may load the calibration result stored in the memory 160 and may apply the loaded calibration result to the gyro sensor 113. According to an embodiment, in the case where there is not supported a file system which is able to access the memory 160, the sensor control module 120 may transmit the calibration result to the processor 170; if the electronic device 100 is rebooted, the sensor control module 120 may receive the calibration result from the processor 170 and may apply the calibration result to the gyro sensor 113.

The battery 130 may power the electronic device 100. For example, the battery 130 may supply power to each of components of the electronic device 100 such that functions of the components are performed.

The input/output interface 140 may be connected with an external device so as to transmit and receive data to and from the external device. According to an embodiment, the input/output interface 140 may be connected with the external device in a wired manner (e.g., a USB interface). According to an embodiment, the electronic device 100 may be fixedly supported by the external device and may be connected with the external device through the input/output interface 140. According to an embodiment, there may be provided a path for charging the battery through the input/output interface 140.

The time management module 150 may manage time information. According to an embodiment, the time management module 150 may count a time and may store the time information (e.g., year/month/date/hour/minute/second) in an internal memory. According to an embodiment, the time management module 150 may set a timer. For example, the time management module 150 may set the timer with a specific period based on a request of the sensor control module 120, and if the set time arrives, the time management module 150 may inform the sensor control module 120 that the timer expires. In FIG. 1, an embodiment of the present disclosure is shown, as the time management module 150 is independent from the sensor control module 120 and/or the processor 170. However, the time management module 150 may be implemented to be embedded in the sensor control module 120 or the processor 170.

The memory 160 may store a calibration result (or an offset value) of the gyro sensor 113. According to an embodiment, the calibration result stored in the memory 160 may be updated. For example, if calibration of the gyro sensor 113 is performed, the sensor control module 120 may store a new calibration result in the memory 160.

The processor 170 may control an overall operation of the electronic device 100. For example, the processor 140 may control the hardware or software components connected to the processor 140 by driving an operating system or an application program and may perform various data processing and arithmetic operations.

According to an embodiment, the processor 170 may determine whether the battery 130 is being charged. According to an embodiment, the processor 170 may transmit information, which is associated with whether the battery 130 is being charged, to the sensor control module 120.

According to an embodiment, if receiving information about an external device connected to the input/output interface 140, the processor 170 may determine whether the connected external device is a specific external device and may transmit information, which is associated with whether the specific external device is connected, to the sensor control module 120. According to an embodiment, if receiving information about an external device connected to the input/output interface 140, the processor 170 may transmit the received information to the sensor control module 120.

According to an embodiment, if receiving a calibration result (or an offset value) from the sensor control module 120, the processor 170 may store the calibration result in the memory 160. According to an embodiment, if the electronic device 100 is rebooted, the processor 170 may transmit the calibration result stored in the memory 160 to the sensor control module 20.

Figure 2:
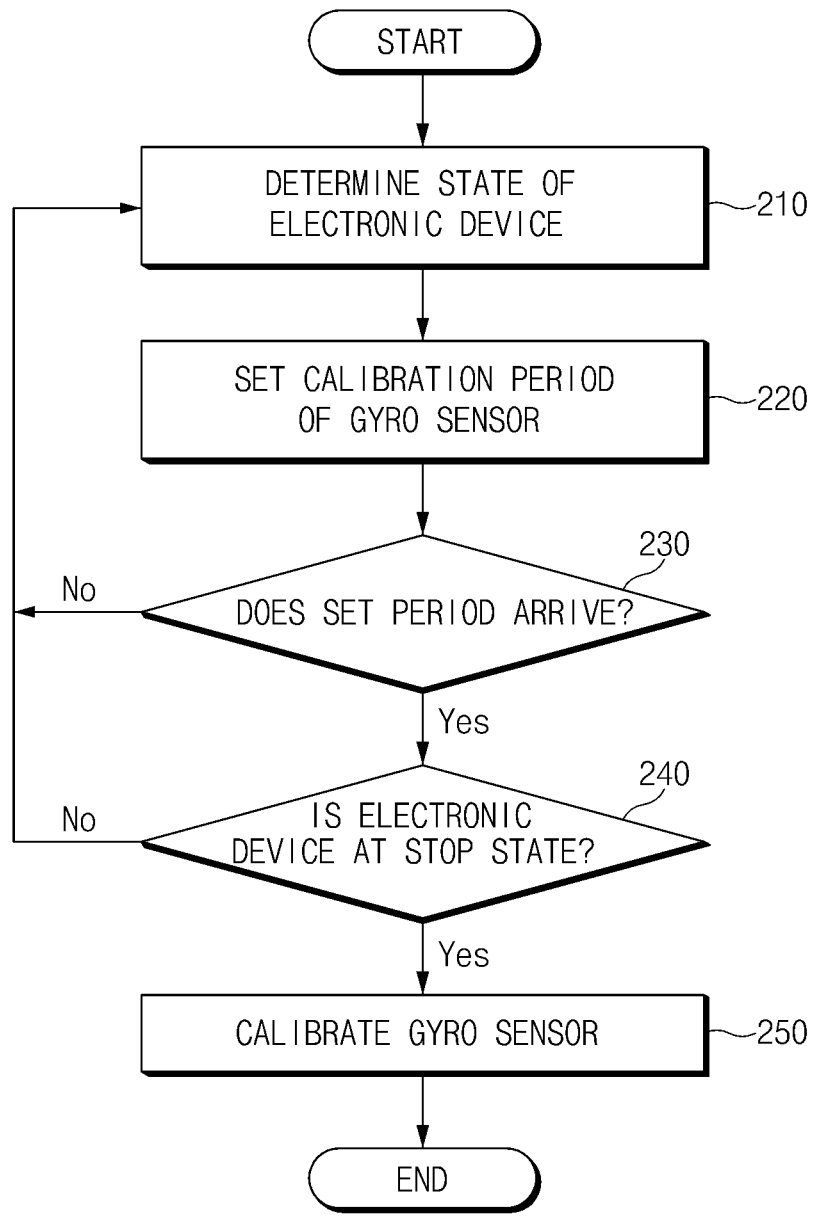
FIG. 2 is a flow chart illustrating a gyro sensor calibrating method of an electronic device according to various embodiments of the present disclosure.

Referring now to FIG. 2, a flow chart indicating a gyro sensor calibrating method of an electronic device according to various embodiments of the present disclosure is shown. The flow chart illustrated in FIG. 2 may include operations, which the electronic device 100 illustrated in FIG. 1 processes. Even though omitted below, the above description of the electronic device 100 illustrated in FIG. 1 may be applied to the method illustrated in FIG. 2.

In operation 210, the electronic device 100 may determine a state of the electronic device 100. For example, the electronic device 100 may determine at least one of an active state of the gyro sensor 113, a charging state of the electronic device 100, or a connection state with a specific external device.

In operation 220, the electronic device 100 may set a calibration period of the gyro sensor 113 based on the state of the electronic device 100 determined in operation 210. According to an embodiment, the electronic device 100 may set the calibration period of the gyro sensor 113 based on a priority given to a state of the electronic device 100, such as an active state of the gyro sensor 113, a charging state of the electronic device 100, or a connection state with a specific external device. Priorities of states of the electronic device 100 may be set, for example, in the following order: a state where the electronic device 100 is being charged>a state where the electronic device 100 is connected with a specific external device>a state where the gyro sensor 113 is activated>other states. For example, if the electronic device 100 is being charged with the gyro sensor 113 activated, the electronic device 100 may set a calibration period (e.g., the second time interval) so as to correspond to a state where the electronic device 100 is being charged, based on the priorities.

In operation 230, the electronic device 100 may determine whether the set calibration period arrives. For example, the electronic device 100 may set a timer corresponding to the calibration period and may receive a response periodically.

If the set calibration period does not arrive, the electronic device 100 may again perform operation 210 to operation 230. According to an embodiment, if a state of the electronic device 100 is changed, in operation 220, the electronic device 100 may again set the calibration period of the gyro sensor 113.

If the set calibration period arrives, in operation 240, the electronic device 100 may determine whether the electronic device 100 is at a stop state, using the acceleration sensor 111. For example, if the acceleration sensor 111 outputs only a sensing value corresponding to the acceleration of gravity in a specific direction, the electronic device 100 may determine such a situation as the stop state. Alternatively, if an acceleration value outputted from the acceleration sensor 111 is constantly maintained, the electronic device 100 may determine such a situation as the stop state. According to an embodiment, the electronic device 100 may determine a state of the electronic device 100 during a specific time (e.g., 10 seconds).

If determined as not being at the stop state, the electronic device 100 may again perform operation 210 to operation 240. That is, if a state of the electronic device 100 is changed, the electronic device 100 may again set the calibration period of the gyro sensor 113 and may wait until a next calibration period arrives.

If determined to be at the stop state, the electronic device 100 may calibrate the gyro sensor 113. For example, when being at the stop state, the electronic device 100 may calculate an offset value of the gyro sensor 113. According to an embodiment, the electronic device 100 may obtain an accurate angular velocity value by correcting an output value of the gyro sensor 113 using the calculated offset value.

According to an embodiment, if the electronic device 100 is determined to be at the stop state with the gyro sensor 113 inactivated, the electronic device 100 may activate the gyro sensor 113 and may then calibrate the gyro sensor 113.

Figure 3:
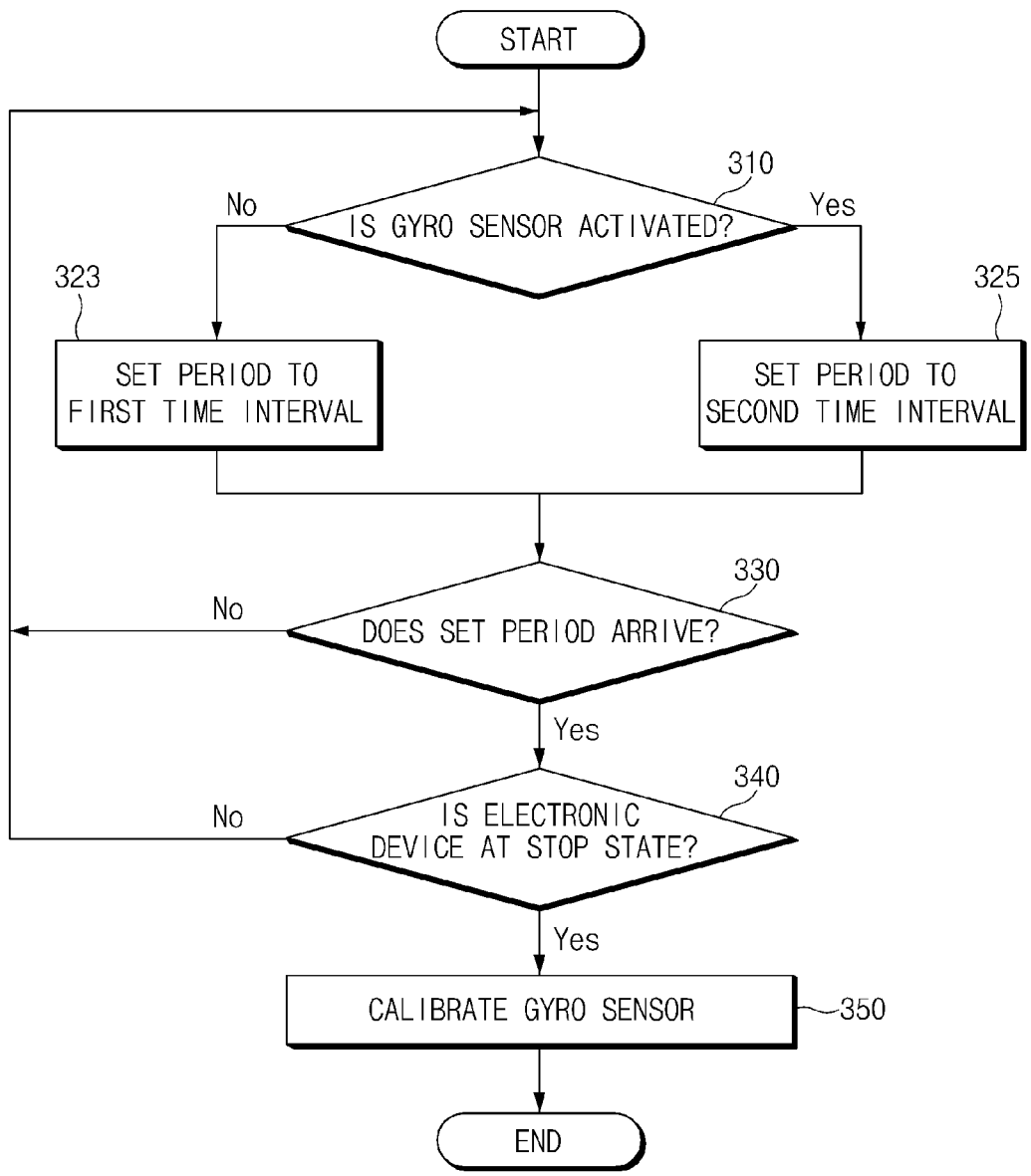
FIG. 3 is a flow chart illustrating a gyro sensor calibrating method of an electronic device according to various embodiments of the present disclosure.

Referring now to FIG. 3, a flow chart indicating a gyro sensor calibrating method of an electronic device according to various embodiments of the present disclosure is shown. A flow chart illustrated in FIG. 3 is a diagram for describing an implementation of a gyro sensor calibrating method illustrated in FIG. 2. For example, operations 310 to 325 illustrated in FIG. 3 may correspond to an implementation of operations 210 to 220 of FIG. 2.

In operation 310, the electronic device 100 may determine whether the gyro sensor 113 is activated. For example, in the case where an application using the gyro sensor 113 is running, the electronic device 100 may determine the gyro sensor 113 as being activated. As another example, in the case where a sensor value is outputted from the gyro sensor 113, the electronic device 100 may determine the gyro sensor 113 as being activated.

If the gyro sensor 113 is at an inactive state, in operation 323, the electronic device 100 may set a calibration period to the first time interval.

If the gyro sensor 113 is at an active state, in operation 325, the electronic device 100 may set the calibration period to the second time interval. According to an embodiment, the second time interval may be shorter than the first time interval. For example, the first time interval may be 10 minutes, and the second time interval may be two minutes.

In operation 330, the electronic device 100 may determine whether the set calibration period arrives. For example, the electronic device 100 may set a timer corresponding to the calibration period and may receive a response periodically.

If the set calibration period does not arrive, the electronic device 100 may again perform operation 310 to operation 330. According to an embodiment, if a state of the gyro sensor 113 is changed, the electronic device 100 may again set the calibration period of the gyro sensor 113. For example, if the gyro sensor 113 is activated in a state where the calibration period is set to the first time interval due to inactivation of the gyro sensor 113, the electronic device 100 may change the calibration period to the second time interval.

If the set calibration period arrives, in operation 340, the electronic device 100 may determine whether the electronic device 100 is at a stop state, using the acceleration sensor 111. For example, if the acceleration sensor 111 outputs only a sensing value corresponding to the acceleration of gravity in a specific direction, the electronic device 100 may determine such a situation as the stop state. Alternatively, if an acceleration value outputted from the acceleration sensor 111 is constantly maintained, the electronic device 100 may determine such a situation as the stop state. According to an embodiment, the electronic device 100 may determine a stop state of the electronic device 100 during a specific time (e.g., 10 seconds).

If determined as not being at the stop state, the electronic device 100 may again perform operation 310 to operation 340. That is, if a state of the gyro sensor 113 is changed, the electronic device 100 may again set the calibration period of the gyro sensor 113 and may wait until a next calibration period arrives.

If determined to be at the stop state, in operation 350, the electronic device 100 may calibrate the gyro sensor 113. For example, when being at the stop state, the electronic device 100 may calculate an offset value of the gyro sensor 113. According to an embodiment, the electronic device 100 may obtain an accurate angular velocity value by correcting an output value of the gyro sensor 113 using the calculated offset value.

According to an embodiment, if the electronic device 100 is determined to be at the stop state with the gyro sensor 113 inactivated, the electronic device 100 may activate the gyro sensor 113 and may then calibrate the gyro sensor 113.

Figure 4:
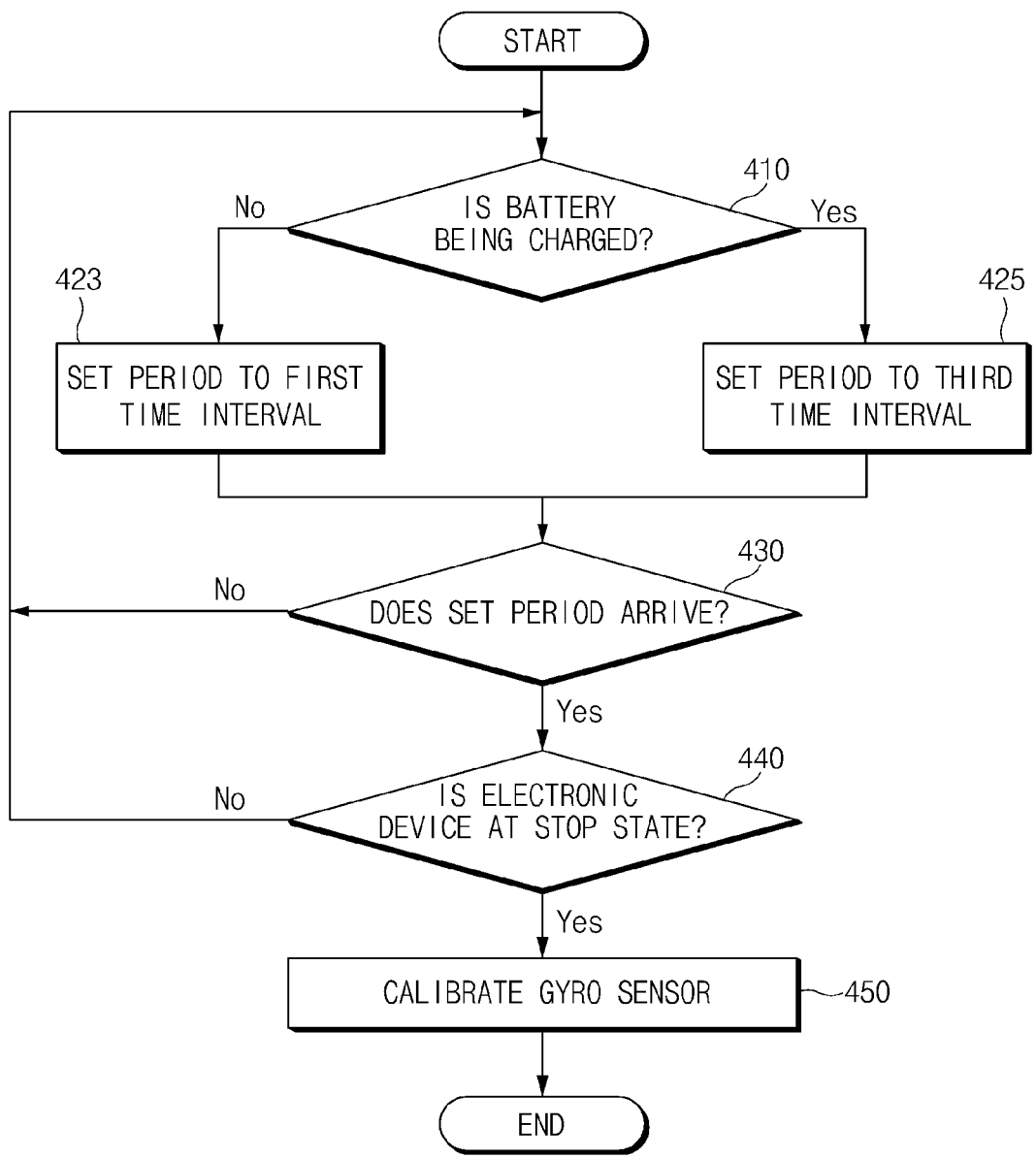
FIG. 4 is a flow chart illustrating a gyro sensor calibrating method of an electronic device according to various embodiments of the present disclosure.

Referring now to FIG. 4, a flow chart indicating a gyro sensor calibrating method of an electronic device according to various embodiments of the present disclosure is shown. The flow chart illustrated in FIG. 4 is a diagram for describing an implementation of a gyro sensor calibrating method illustrated in FIG. 2. For example, operations 410 to 425 illustrated in FIG. 4 may correspond to an implementation of operations 210 to 220 of FIG. 2.

In operation 410, the electronic device 100 may determine whether the battery 130 is being charged. For example, the electronic device 100 may measure a voltage of the battery 130 or a current flowing from the battery 130 and may determine whether the battery 130 is being charged. According to an embodiment, a manner to charge the battery 130 may include a wireless charging manner, such as magnetic resonance or magnetic induction, as well as a wired charging manner.

If the battery 130 is not being charged, in operation 423, the electronic device 100 may set a calibration period to the first time interval.

If the battery 130 is being charged, in operation 425, the electronic device 100 may set the calibration period to the third time interval. According to an embodiment, the third time interval may be shorter than the first time interval. For example, the first time interval may be 10 minutes, and the third time interval may be one minute.

In operation 430, the electronic device 100 may determine whether the set calibration period arrives. For example, the electronic device 100 may set a timer corresponding to the calibration period and may receive a response periodically.

If the set calibration period does not arrive, the electronic device 100 may again perform operation 410 to operation 430. According to an embodiment, if a state of the battery 130 is changed, the electronic device 100 may again set the calibration period of the gyro sensor 113. For example, if the battery 130 is changed into a charging state in a state where the calibration period is set to the first time interval because the battery 130 is not being charged, the electronic device 100 may change the calibration period into the third time interval.

If the set calibration period arrives, in operation 440, the electronic device 100 may determine whether the electronic device 100 is at a stop state, using the acceleration sensor 111. For example, if the acceleration sensor 111 outputs only a sensing value corresponding to the acceleration of gravity in a specific direction, the electronic device 100 may determine such a situation as the stop state. Alternatively, if an acceleration value outputted from the acceleration sensor 111 is constantly maintained, the electronic device 100 may determine such a situation as the stop state. According to an embodiment, the electronic device 100 may determine a stop state of the electronic device 100 during a specific time (e.g., 10 seconds). If determined to not be at the stop state, the electronic device 100 may again perform operation 410 to operation 440. That is, if a charging state of the battery 130 is changed, the electronic device 100 may again set the calibration period of the gyro sensor 113 and may wait until a next calibration period arrives.

If determined to be at the stop state, the electronic device 100 may calibrate the gyro sensor 113. For example, when being at the stop state, the electronic device 100 may calculate an offset value of the gyro sensor 113. According to an embodiment, the electronic device 100 may obtain an accurate angular velocity value by correcting an output value of the gyro sensor 113 using the calculated offset value.

According to an embodiment, if the electronic device 100 is determined to be at the stop state with the gyro sensor 113 inactivated, the electronic device 100 may activate the gyro sensor 113 and may then calibrate the gyro sensor 113.

According to an embodiment, if the electronic device 100 is being charged in a wireless manner such as a magnetic induction manner, the electronic device 100 may skip a process of determining whether the electronic device 100 is at a stop state. That is, since the probability that the electronic device 100 is at a stop state is high while being charged in the magnetic induction manner, the electronic device 100 may skip a process of determining whether the electronic device 100 is at a stop state, using the acceleration sensor 111.

Figure 5:
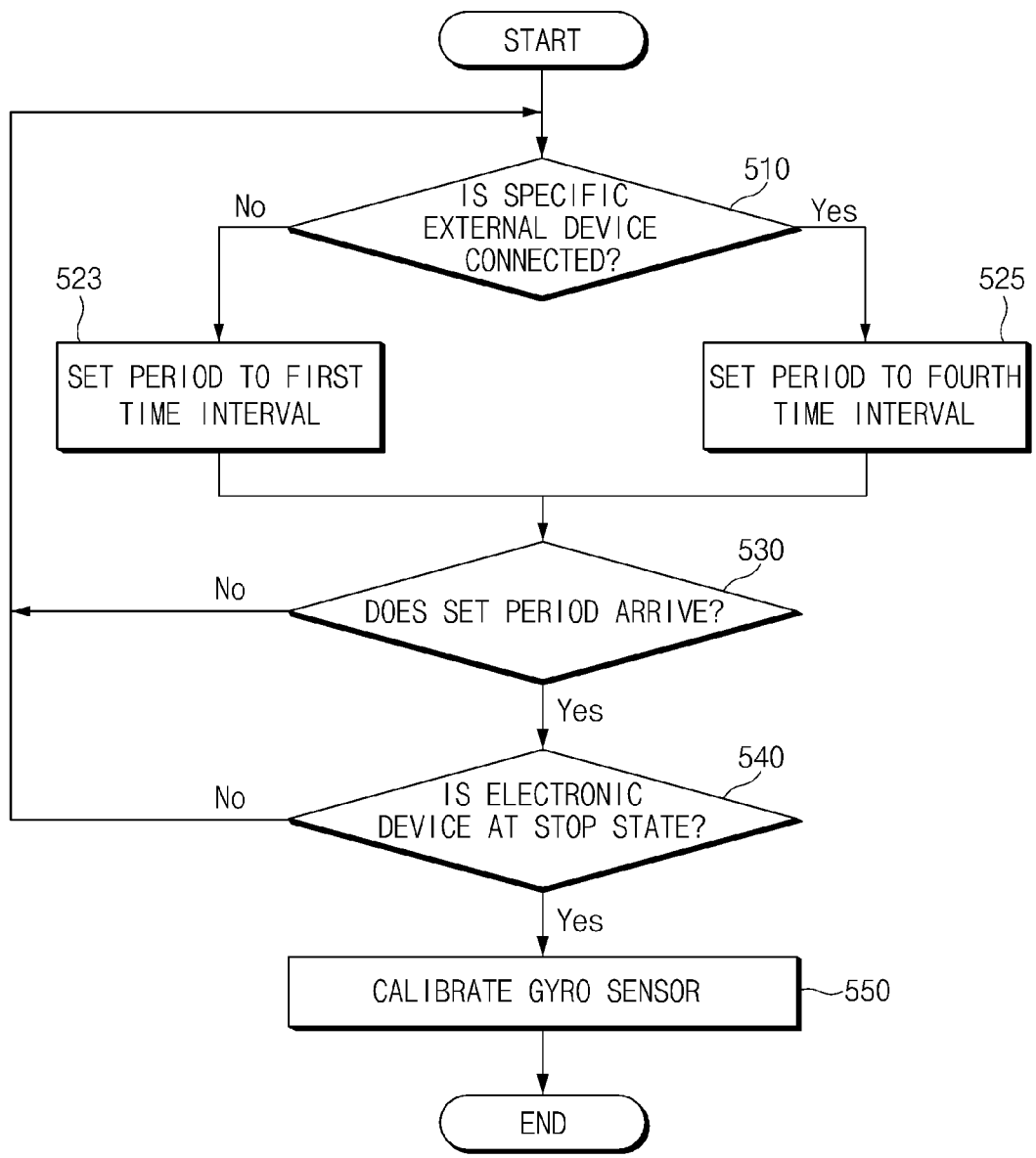
FIG. 5 is a flow chart illustrating a gyro sensor calibrating method of an electronic device according to various embodiments of the present disclosure.

Referring now to FIG. 5, a flow chart indicating a gyro sensor calibrating method of an electronic device according to various embodiments of the present disclosure is shown. The flow chart illustrated in FIG. 5 is a diagram for describing an implementation of a gyro sensor calibrating method illustrated in FIG. 2. For example, operations 510 to 525 illustrated in FIG. 5 may correspond to an implementation of operations 210 to 220 of FIG. 2.

In FIG. 5, at operation 510, the electronic device 100 may determine whether the electronic device 100 is connected with a specific external device. According to an embodiment, the electronic device 100 may determine whether a specific external device is connected to the input/output interface 140.

In the case where the specific external device is not connected to the input/output interface 140, in operation 523, the electronic device 100 may set a calibration period to the first time interval.

In the case where the specific external device is connected to the input/output interface 140, in operation 525, the electronic device 100 may set a calibration period to the fourth time interval. According to an embodiment, the fourth time interval may be shorter than the first time interval. For example, the first time interval may be 10 minutes, and the fourth time interval may be five minutes.

In operation 530, the electronic device 100 may determine whether the set calibration period arrives. For example, the electronic device 100 may set a timer corresponding to the calibration period and may receive a response periodically.

If the set calibration period does not arrive, the electronic device 100 may again perform operation 510 to operation 530. According to an embodiment, if a connection state of the external device is changed, the electronic device 100 may again set the calibration period of the gyro sensor 113. For example, if a specific external device is connected in a state where the calibration period is set to the first time interval because the specific external device is not connected, the electronic device 100 may change the calibration period into the fourth time interval.

If the set calibration period arrives, in operation 540, the electronic device 100 may determine whether the electronic device 100 is at a stop state, using the acceleration sensor 111. For example, if the acceleration sensor 111 outputs only a sensing value corresponding to the acceleration of gravity in a specific direction, the electronic device 100 may determine such a situation as the stop state. Alternatively, if an acceleration value outputted from the acceleration sensor 111 is constantly maintained, the electronic device 100 may determine such a situation as the stop state. According to an embodiment, the electronic device 100 may determine a stop state of the electronic device 100 during a specific time (e.g., 10 seconds).

If determined to not be at the stop state, the electronic device 100 may again perform operation 510 to operation 540. That is, if a connection state with the specific external device is changed, the electronic device 100 may again set the calibration period of the gyro sensor 113 and may wait until a next calibration period arrives.

If determined to be at the stop state, in operation 550, the electronic device 100 may calibrate the gyro sensor 113. For example, when being at the stop state, the electronic device 100 may calculate an offset value of the gyro sensor 113. According to an embodiment, the electronic device 100 may obtain an accurate angular velocity value by correcting an output value of the gyro sensor 113 using the calculated offset value.

According to an embodiment, if the electronic device 100 is determined to be at the stop state with the gyro sensor 113 inactivated, the electronic device 100 may activate the gyro sensor 113 and may then calibrate the gyro sensor 113.

According to an embodiment, in the case where the electronic device 100 is connected with the specific external device (e.g., an audio dock), the electronic device 100 may skip a process of determining whether the electronic device 100 is at a stop state. That is, since the probability that the electronic device 100 is at a stop state is high if the electronic device 100 is connected with a device such as an audio dock, the electronic device 100 may skip a process of determining whether the electronic device 100 is at a stop state using the acceleration sensor 111.

Figure 6:
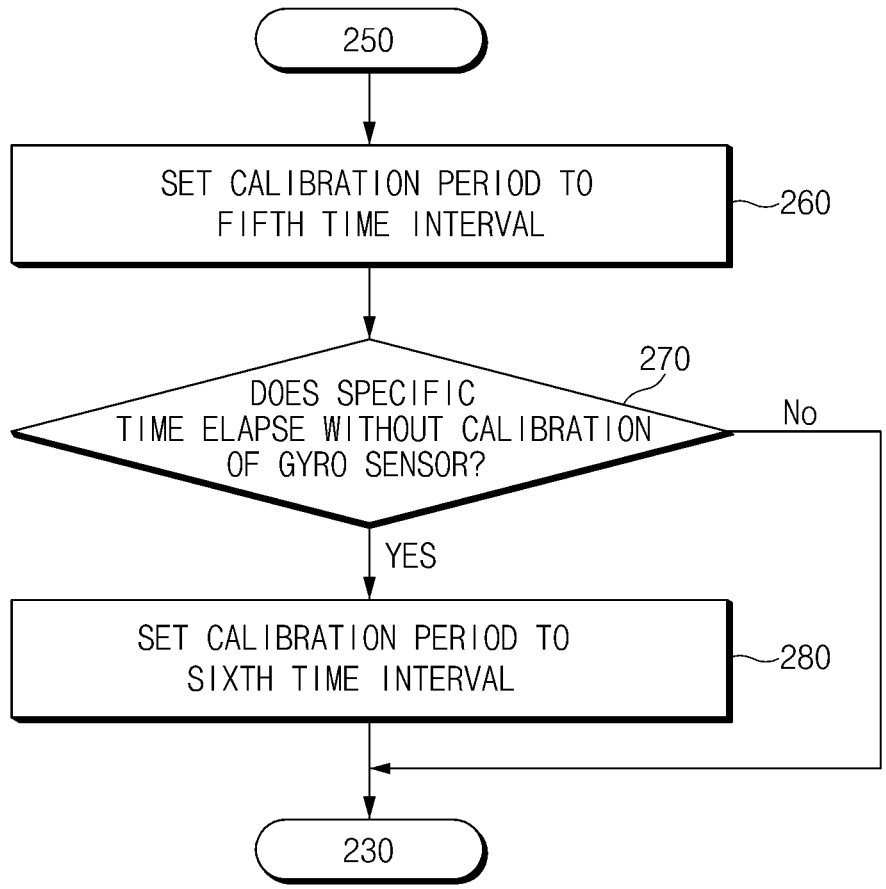
FIG. 6 is a flow chart illustrating a gyro sensor calibrating method of an electronic device according to various embodiments of the present disclosure.

Referring now to FIG. 6, a flow chart indicating a gyro sensor calibrating method of an electronic device according to various embodiments of the present disclosure is shown. The flow chart illustrated in FIG. 6 shows an operation, which is additionally performed, of a gyro sensor calibrating method illustrated in FIG. 2.

If calibration of the gyro sensor 113 is completed in operation 250 of FIG. 2, the electronic device 100 may set a calibration period to the fifth time interval in operation 260. According to an embodiment, the fifth time interval may be longer than a current calibration period (e.g., one of the first time interval to the fourth time interval).

According to an embodiment, in operation 270, the electronic device 100 may determine whether a specific time elapses without performing calibration of the gyro sensor 113. That is, the electronic device 100 may determine whether a specific time elapses after calibration of the gyro sensor 113 is completed.

According to an embodiment, if no specific time elapses after calibration of the gyro sensor 113 is completed, the electronic device 100 may again perform operations 230 to 250.

According to an embodiment, if the specific time elapses after calibration of the gyro sensor 113 is completed, in operation 280, the electronic device 100 may set the calibration period to the sixth time interval. According to an embodiment, the sixth time interval may be shorter than the fifth time interval. In operation 230, the electronic device 100 may determine whether the set calibration period arrives.

According to an embodiment described with reference to FIG. 6, the calibration period may be set according to a time elapsing after the calibration of the gyro sensor 113 is completed. For example, after the calibration of the gyro sensor 113 is completed, the calibration period may be set long, thereby reducing current consumption due to unnecessary calibration. If a long time elapses after the calibration of the gyro sensor 113 is completed, an error of the gyro sensor 113 may increase. For this reason, the calibration period may be set to a shorter time interval.

Figure 7:
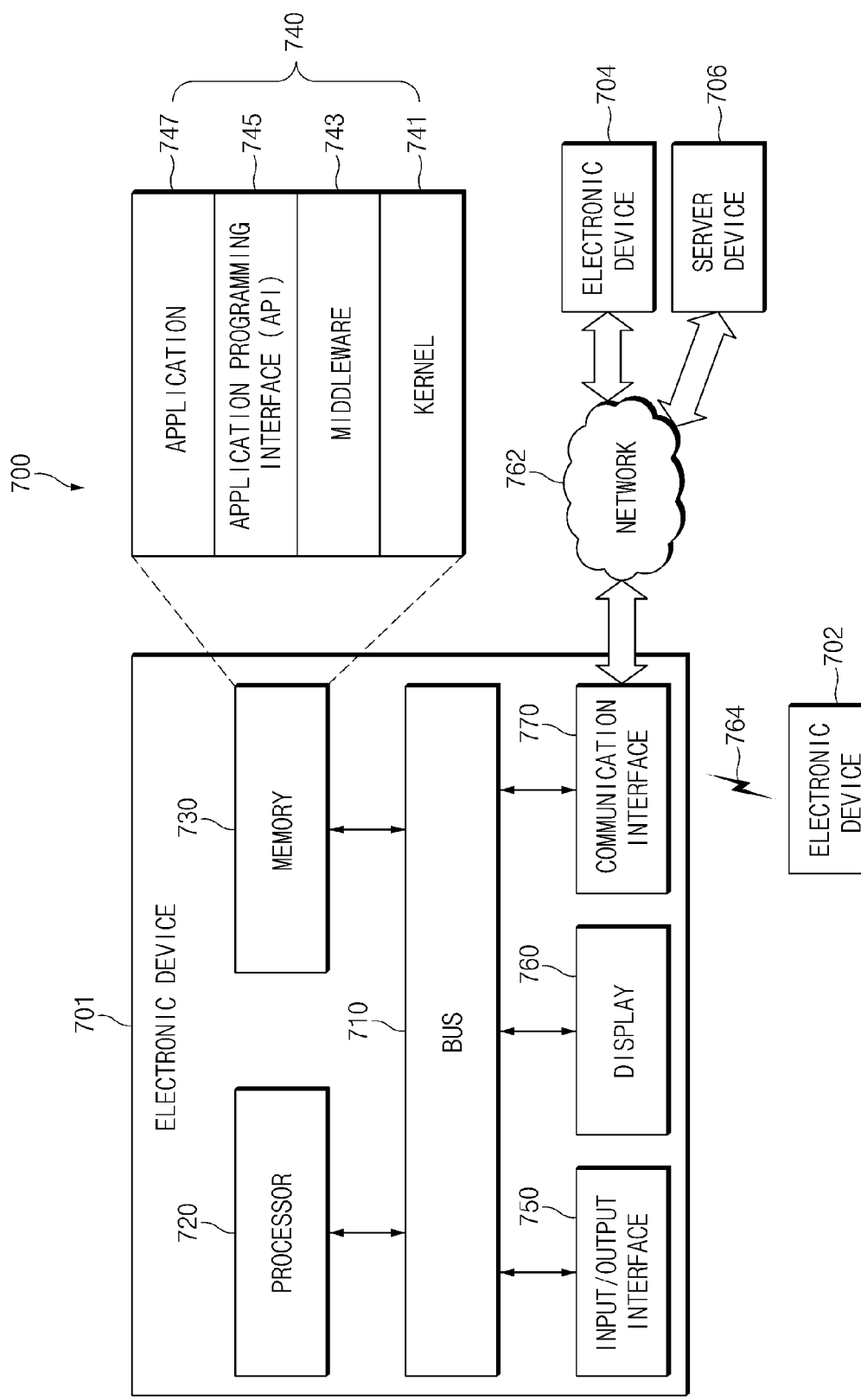
FIG. 7 is a diagram illustrating an electronic device in a network environment, according to various embodiments of the present disclosure.

Referring now to FIG. 7, a diagram illustrating an electronic device in a network environment, according to various embodiments of the present disclosure, is shown.

In FIG. 7, there is illustrated an electronic device 701 (e.g., the electronic device 100) in a network environment 700 according to various embodiments of the present disclosure. The electronic device 701 may include a bus 710, a processor 720, a memory 730, an input/output (I/O) interface 750, a display 760, and a communication interface 770. According to an embodiment of the present disclosure, the electronic device 701 may not include at least one of the above-described components or may further include other component(s).

The bus 710 may interconnect the above-described components to the communication interface 770 and may be a circuit for conveying communications (e.g., a control message and/or data) among the above-described components.

The processor 720 may include one or more of a central processing unit (CPU), an application processor (AP), or a communication processor (CP). The processor 720 may perform, for example, data processing or an operation associated with control or communication of at least one other component of the electronic device 701.

The memory 730 may include a volatile and/or nonvolatile memory. The memory 730 may store instructions or data associated with at least one other component of the electronic device 701. According to various embodiments of the present disclosure, the memory 730 may store software and/or a program 740. The program 740 may include, for example, a kernel 741, a middleware 743, an application programming interface (API) 745, and/or an application (or an application program) 747. At least a portion of the kernel 741, the middleware 743, or the API 745 may be called an "operating system (OS)".

The kernel 741 may control or manage system resources (e.g., the bus 710, the processor 720, the memory 730, and the like) that are used to execute operations or functions of other programs (e.g., the middleware 743, the API 745, and the application program 747). Furthermore, the kernel 741 may provide an interface that allows the middleware 743, the API 745, or the application program 747 to access discrete components of the electronic device 701 so as to control or manage system resources.

The middleware 743 may perform a mediation role such that the API 745 or the application program 747 communicates with the kernel 741 to exchange data.

Furthermore, the middleware 743 may process task requests received from the application program 747 according to a priority. For example, the middleware 743 may assign the priority, which makes it possible to assign a system resource (e.g., the bus 710, the processor 720, the memory 730, or the like) of the electronic device 701, to at least one of the application programs 747. For example, the middleware 743 may process the one or more task requests according to the priority assigned to the at least one application program 747, which makes it possible to perform scheduling or load balancing on the one or more task requests.

The API 745 may be an interface through which the application program 747 controls a function provided by the kernel 741 or the middleware 743, and may include, for example, at least one interface or function (e.g., an instruction) for a file control, a window control, image processing, a character control, or the like.

The I/O interface 750 may transmit an instruction or data, input from a user or another external device, to other at least one component of the electronic device 701. Furthermore, the I/O interface 750 may output an instruction or data, received from at least one other component of the electronic device 701, to a user or another external device.

The display 760 may include, for example, a liquid crystal display (LCD), a light-emitting diode (LED) display, an organic LED (OLED) display, or a microelectromechanical systems (MEMS) display, or an electronic paper display. The display 760 may display, for example, various contents (e.g., a text, an image, a video, an icon, a symbol, and the like) to a user. The display 760 may include a touch screen and may receive, for example, a touch, gesture, proximity, or hovering input using an electronic pen or a portion of a user's body.

The communication interface 770 may establish communication between the electronic device 701 and an external electronic device (e.g., a first external electronic device 702, a second external electronic device 704, or a server 706). For example, the communication interface 770 may be connected to a network 762 through wireless communication or wired communication to communicate with the external device (e.g., a second external electronic device 704 or a server 706).

The wireless communication may include at least one of, for example, long-term evolution (LTE), LTE Advance (LTE-A), code division multiple access (CDMA), wideband CDMA (WCDMA), universal mobile telecommunications system (UMTS), wireless broadband (WiBro), or global system for mobile communications (GSM), or the like, as cellular communication protocol. Furthermore, the wireless communication may include, for example, a local area network 764. The local area network 764 may include, for example, at least one of Wi-Fi, Bluetooth, near field communication (NFC), global positioning system (GPS), or the like. A Global Navigation Satellite System (GNSS) may include, for example, at least one global positioning system (GPS), global navigation satellite system (Glonass), Beidou Navigation Satellite System (hereinafter referred to as "Beidou"), Galileo, or the European global satellite-based navigation system. Below, "GSP" and "GNSS" may be interchangeably used. The wired communication may include at least one of, for example, a universal serial bus (USB), a high definition multimedia interface (HDMI), a recommended standard-732 (RS-732), or a plain old telephone service (POTS). The network 762 may include at least one of telecommunications networks, for example, a computer network (e.g., LAN or WAN), an internet, or a telephone network.

Each of the first and second external electronic devices 702 and 704 may be a device of which the type is different from or the same as that of the electronic device 701. According to an embodiment of the present disclosure, the server 706 may include a group of one or more servers. According to various embodiments of the present disclosure, all or a part of operations that the electronic device 701 will perform may be executed by another or plural electronic devices (e.g., the electronic devices 702 and 704 and the server 706). According to an embodiment of the present disclosure, in the case where the electronic device 701 executes any function or service automatically or in response to a request, the electronic device 701 may not perform the function or the service internally, but, alternatively, it may request at least a portion of a function associated with the electronic device 701 at another device (e.g., the electronic device 702 or 704 or the server 706). The other electronic device (e.g., the electronic device 702 or 704 or the server 706) may execute the requested function or additional function and may transmit the execution result to the electronic device 701. The electronic device 701 may provide the requested function or service using the received result or may additionally process the received result to provide the requested function or service. To this end, for example, cloud computing, distributed computing, or client-server computing may be used.

Figure 8:
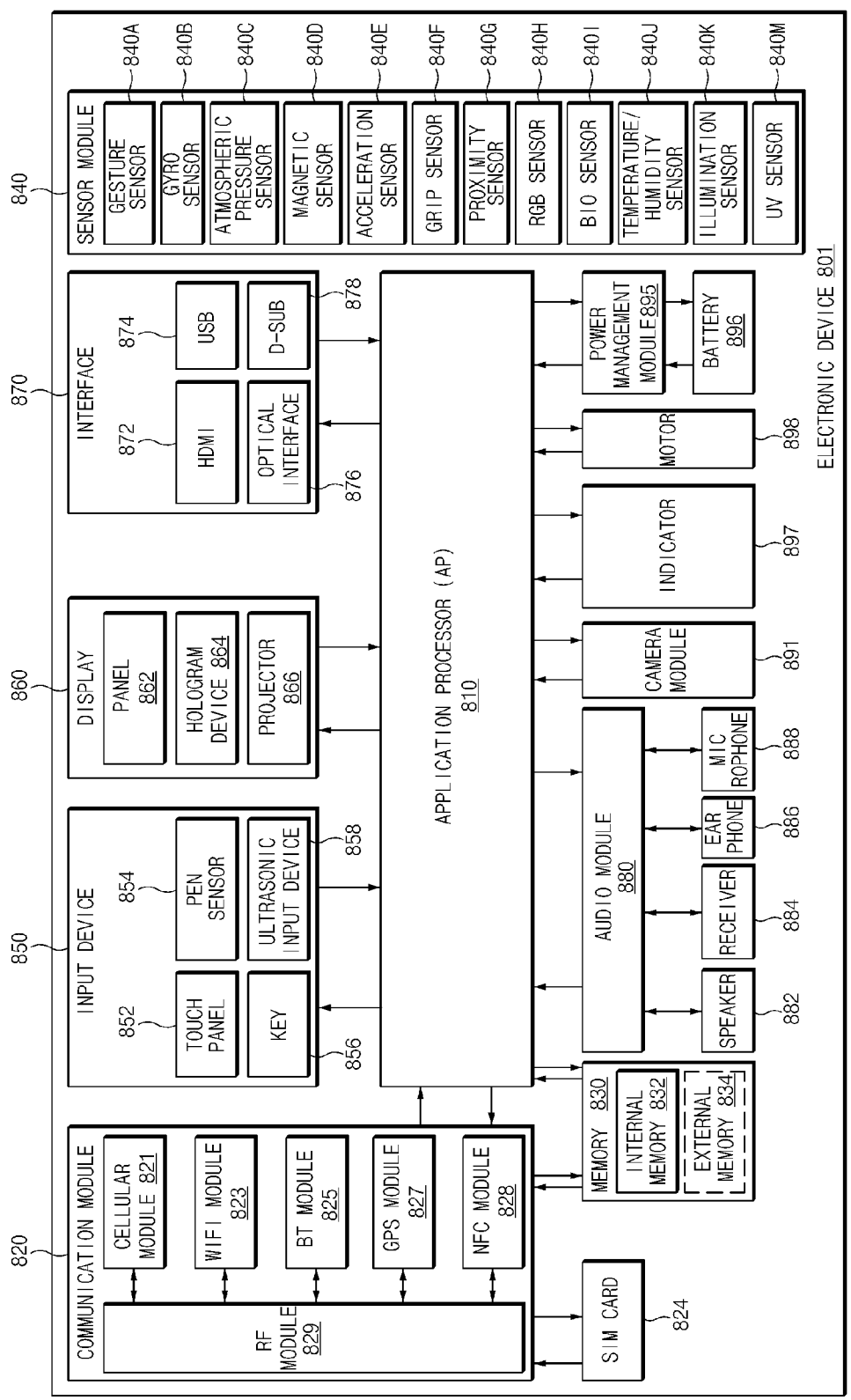
FIG. 8 is a block diagram illustrating an electronic device according to various embodiments of the present disclosure.

Referring now to FIG. 8, a block diagram illustrating an electronic device 801 according to various embodiments of the present disclosure is shown. An electronic device 801 may include, for example, all or a part of an electronic device 100 or 701 illustrated in FIG. 1 or 7, respectively. The electronic device 801 may include one or more processors (e.g., an application processor (AP), a graphics processor, and the like) 810, a communication module 820, a subscriber identification module (SIM) 824, a memory 830, a sensor module 840, an input device 850, a display 860 (e.g., the display 160), an interface 870, an audio module 880, a camera module 891, a power management module 895, a battery 896, an indicator 897, and a motor 898.

The processor 810 (e.g., the processor 170) may drive an operating system (OS) or an application to control a plurality of hardware or software components connected to the processor 810 and may process and compute a variety of data. The processor 810 may be implemented with a System on Chip (SoC), for example. According to an embodiment of the present disclosure, the processor 810 may further include a graphic processing unit (GPU) and/or an image signal processor. The processor 810 may include at least a part (e.g., a cellular module 821) of the components illustrated in FIG. 8. The processor 810 may load and process an instruction or data, which is received from at least one of the other components (e.g., a non-volatile memory), and may store a variety of data at a nonvolatile memory.

The communication module 820 may be configured in the same as or similar to the communication interface 770 of FIG. 7. The communication module 820 may include a cellular module 821, a wireless-fidelity (Wi-Fi) module 823, a Bluetooth (BT) module 825, a GNSS module 827 (e.g., a global positioning system (GPS) module, a Beidou module, or a Galileo module), a near field communication (NFC) module 828, and/or a radio frequency (RF) module 829.

The cellular module 821 may provide voice communication, video communication, a character service, an Internet service or the like through a communication network. According to an embodiment of the present disclosure, the cellular module 821 may perform discrimination and authentication of an electronic device 801 within a communication network using a subscriber identification module 824 (e.g., a SIM card), for example. According to an embodiment of the present disclosure, the cellular module 821 may perform at least a portion of functions that the processor 810 provides. According to an embodiment of the present disclosure, the cellular module 821 may include a communication processor (CP).

Each of the Wi-Fi module 823, the BT (Bluetooth) module 825, the GNSS module 827, and the NFC module 828 may include a processor for processing data exchanged through a corresponding module, for example. According to an embodiment of the present disclosure, at least a portion (e.g., two or more components) of the cellular module 821, the Wi-Fi module 823, the BT module 825, the GNSS module 827, and the NFC module 828 may be included within one Integrated Circuit (IC) or an IC package.

The RF module 829 may transmit and receive a communication signal (e.g., an RF signal). The RF module 829 may include a transceiver, a power amplifier module (PAM), a frequency filter, a low noise amplifier (LNA), an antenna, or the like. According to various embodiments of the present disclosure, at least one of the cellular module 821, the Wi-Fi module 823, the BT module 825, the GNSS module 827, or the NFC module 828 may transmit and receive an RF signal through a separate RF module.

The subscriber identification module 824 may include, for example, a subscriber identification module and may include unique identifying information (e.g., integrated circuit card identifier (ICCID)) or subscriber information (e.g., integrated mobile subscriber identity (IMSI)).

The memory 830 (e.g., a memory 730) may include an internal (or embedded) memory 832 or an external memory 834. For example, the internal memory 832 may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory), a hard drive, or a solid state drive (SSD).

The external memory 834 may include a flash drive, for example, compact flash (CF), secure digital (SD), micro secure digital (Micro-SD), mini secure digital (Mini-SD), extreme digital (xD), multimedia card (MMC), a memory stick, or the like. The external memory 834 may be functionally and/or physically connected to the electronic device 801 through various interfaces.

The sensor module 840 may measure, for example, a physical quantity or may detect an operation state of the electronic device 801. The sensor module 840 may convert the measured or detected information to an electric signal. The sensor module 840 may include at least one of a gesture sensor 840A, a gyro sensor 840B, a barometric pressure sensor 840C, a magnetic sensor 840D, an acceleration sensor 840E, a grip sensor 840F, a proximity sensor 840G, a color sensor 840H (e.g., red, green, blue (RGB) sensor), a biometric sensor 840I, a temperature/humidity sensor 840J, an illuminance sensor 840K, or an UV sensor 840M. Although not illustrated, additionally or alternatively, the sensor module 840 may further include, for example, an E-nose sensor, an electromyography sensor (EMG) sensor, an electroencephalogram (EEG) sensor, an electrocardiogram (ECG) sensor, a photoplethysmographic (PPG) sensor, an infrared (IR) sensor, an iris sensor, and/or a fingerprint sensor. The sensor module 840 may further include a control circuit for controlling at least one or more sensors included therein. According to an embodiment of the present disclosure, the electronic device 801 may further include a processor (e.g., the sensor control module 120), which is a part of the processor 810 or independent of the processor 810 and is configured to control the sensor module 840. The processor may control the sensor module 840 while the processor 810 remains at a sleep state.

The input device 850 may include, for example, a touch panel 852, a (digital) pen sensor 854, a key 856, or an ultrasonic input unit 858. The touch panel 852 may use at least one of capacitive, resistive, infrared and ultrasonic detecting methods. Also, the touch panel 852 may further include a control circuit. The touch panel 852 may further include a tactile layer to provide a tactile reaction to a user.

The (digital) pen sensor 854 may be, for example, a part of a touch panel or may include an additional sheet for recognition. The key 856 may include, for example, a physical button, an optical key, a keypad, and the like. The ultrasonic input device 858 may detect (or sense) an ultrasonic signal, which is generated from an input device, through a microphone (e.g., a microphone 888) and may check data corresponding to the detected ultrasonic signal.

The display 860 (e.g., a display 1060) may include a panel 862, a hologram device 864, or a projector 866. The panel 862 may be configured in the same as or similar to the display 160 of FIG. 1. The panel 862 and the touch panel 852 may be integrated into a single module. The hologram device 864 may display a stereoscopic image in a space using a light interference phenomenon. The projector 866 may project light onto a screen so as to display an image. The screen may be arranged in the inside or the outside of the electronic device 801. According to an embodiment of the present disclosure, the display 860 may further include a control circuit for controlling the panel 862, the hologram device 864, or the projector 866.

The interface 870 may include, for example, an HDMI (high-definition multimedia interface) 872, a USB (universal serial bus) 874, an optical interface 876, or a D-sub (D-sub-miniature) 878. The interface 870 may be included, for example, in a communication interface 770 illustrated in FIG. 7. Additionally or generally, the interface 870 may include, for example, a mobile high definition link (MHL) interface, a SD card/multi-media card (MMC) interface, or an infrared data association (IrDA) standard interface.

The audio module 880 may convert a sound and an electric signal in dual directions. At least a portion of the audio module 880 may be included, for example, in an input/output interface 750 illustrated in FIG. 7. The audio module 880 may process, for example, sound information that is input or output through a speaker 882, a receiver 884, an earphone 886, or a microphone 888.

The camera module 891 for shooting a still image or a video may include, for example, at least one image sensor (e.g., a front sensor or a rear sensor), a lens, an image signal processor (ISP), or a flash (e.g., an LED or a xenon lamp).

The power management module 895 may manage, for example, power of the electronic device 801. According to an embodiment of the present disclosure, a power management integrated circuit (PMIC), a charger IC, or a battery/fuel gauge may be included in the power management module 895. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 896 and a voltage, current or temperature thereof while the battery is charged. The battery 896 may include, for example, a rechargeable battery or a solar battery.

The indicator 897 may display a specific state of the electronic device 801 or a portion thereof (e.g., a processor 810), such as a booting state, a message state, a charging state, and the like. The motor 898 may convert an electrical signal into a mechanical vibration and may generate the following effects: vibration, haptic, and the like. Although not illustrated, a processing device (e.g., a GPU) for supporting a mobile TV may be included in the electronic device 801. The processing device for supporting a mobile TV may process media data according to the standards of DMB, digital video broadcasting (DVB), MediaFlo™, or the like.

Each of the above-mentioned elements of the electronic device according to various embodiments of the present disclosure may be configured with one or more components, and the names of the elements may be changed according to the type of the electronic device. The electronic device according to various embodiments of the present disclosure may include at least one of the above-mentioned elements, and some elements may be omitted or other additional elements may be added. Furthermore, some of the elements of the electronic device according to various embodiments of the present disclosure may be combined with each other so as to form one entity, so that the functions of the elements may be performed in the same manner as before the combination.

Figure 9:
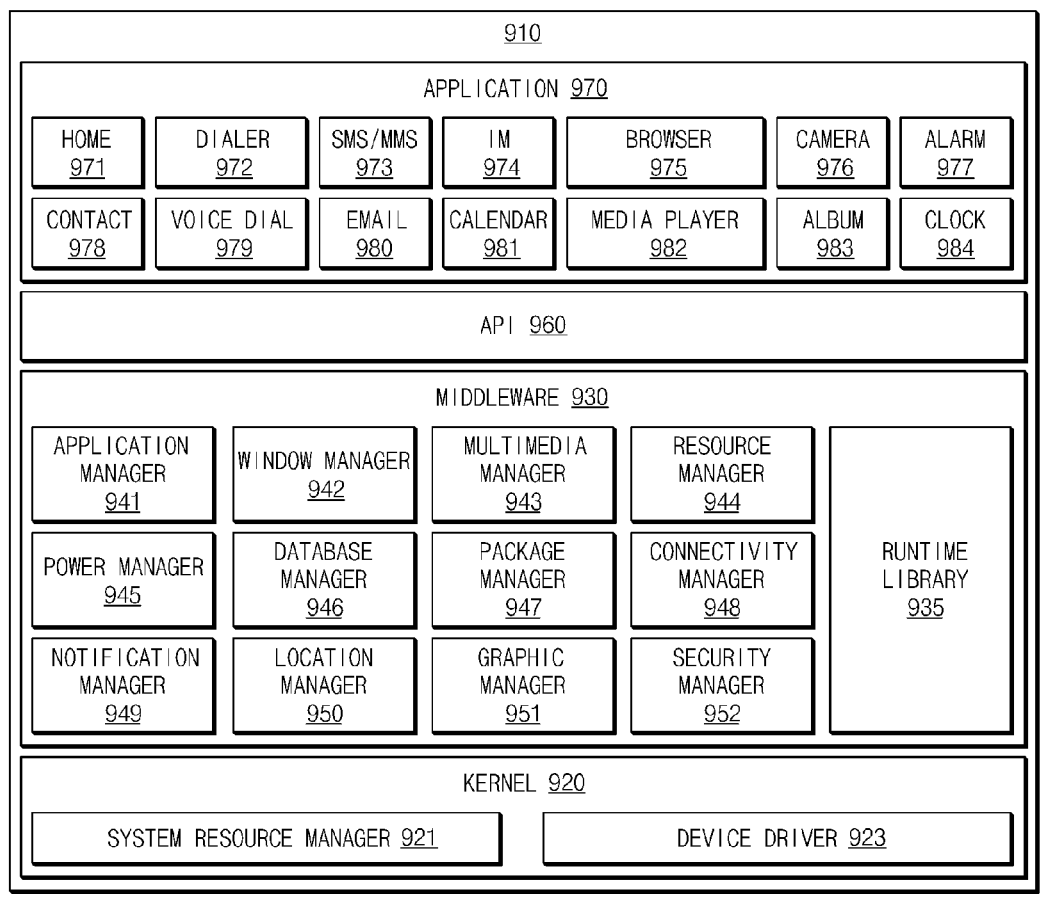
FIG. 9 is a block diagram illustrating a program module according to various embodiments of the present disclosure.

Referring now to FIG. 9, a block diagram of a program module 910 according to various embodiments of the present disclosure is shown. According to an embodiment of the present disclosure, a program module 910 (e.g., a program 740) may include an operating system (OS) to control resources associated with an electronic device (e.g., an electronic device 100), and/or diverse applications (e.g., an application program 747) driven on the OS. The OS may be, for example, android, iOS, windows, Symbian, tizen, or bada.

The program module 910 may include a kernel 920, a middleware 930, an application programming interface (API) 960, and/or an application 970. At least a part of the program module 910 may be preloaded on an electronic device or may be downloadable from an external electronic device (e.g., an electronic device 702 or 704, a server 706, and the like).

The kernel 920 (e.g., a kernel 741) may include, for example, a system resource manager 921 or a device driver 923. The system resource manager 921 may perform control, allocation, or retrieval of system resources. According to an embodiment of the present disclosure, the system resource manager 921 may include a process managing part, a memory managing part, or a file system managing part. The device driver 923 may include, for example, a display driver, a camera driver, a Bluetooth driver, a common memory driver, a USB driver, a keypad driver, a Wi-Fi driver, an audio driver, or an inter-process communication (IPC) driver.

The middleware 930 may provide, for example, a function which the application 970 needs in common, or may provide diverse functions to the application 970 through the API 960 to allow the application 970 to efficiently use limited system resources of the electronic device. According to an embodiment of the present disclosure, the middleware 930 (e.g., a middleware 743) may include at least one of a runtime library 935, an application manager 941, a window manager 942, a multimedia manager 943, a resource manager 944, a power manager 945, a database manager 946, a package manager 947, a connectivity manager 948, a notification manager 949, a location manager 950, a graphic manager 951, or a security manager 952.

The runtime library 935 may include, for example, a library module which is used by a compiler to add a new function through a programming language while the application 970 is being executed. The runtime library 935 may perform input/output management, memory management, or capacities dealing with arithmetic functions.

The application manager 941 may manage, for example, a life cycle of at least one application of the application 970. The window manager 942 may manage a GUI resource, which is used in a screen. The multimedia manager 943 may identify a format necessary for playing diverse media files, and may perform encoding or decoding of media files by using a codec suitable for the format. The resource manager 944 may manage resources such as a storage space, memory, or source code of at least one application of the application 970.

The power manager 945 may operate, for example, with a basic input/output system (BIOS) to manage a battery or power, and may provide power information for an operation of an electronic device. The database manager 946 may generate, search for, or modify a database, which is to be used in at least one application of the application 970. The package manager 947 may install or update an application, which is distributed in the form of package file.

The connectivity manager 948 may manage, for example, wireless connection such as Wi-Fi or Bluetooth. The notification manager 949 may display or notify an event such as arrival message, promise, or proximity notification in a mode that does not disturb a user. The location manager 950 may manage location information of an electronic device. The graphic manager 951 may manage a graphic effect that is provided to a user, or manage a user interface relevant thereto. The security manager 952 may provide a general security function necessary for system security or user authentication. According to an embodiment of the present disclosure, in the case where an electronic device (e.g., an electronic device 701) includes a telephony function, the middleware 930 may further include a telephony manager for managing a voice or video call function of the electronic device.

The middleware 930 may include a middleware module that combines diverse functions of the above-described components. The middleware 930 may provide a module specialized to each OS kind to provide differentiated functions. Additionally, the middleware 930 may remove a part of the preexisting components, dynamically, or may add a new component thereto.

The API 960 (e.g., an API 745) may be, for example, a set of programming functions and may be provided with a configuration, which varies depending on the OS. For example, in the case where an OS is the android or the iOS, it may be permissible to provide one API set per platform. In the case where an OS is the tizen, it may be permissible to provide two or more API sets per platform.

The application 970 (e.g., an application program 747) may include, for example, one or more applications capable of providing functions for a home 971, a dialer 972, an SMS/MMS 973, an instant message (IM) 974, a browser 975, a camera 976, an alarm 977, a contact 978, a voice dial 979, an e-mail 980, a calendar 981, a media player 982, an album 983, a timepiece 984, or for offering health care (e.g., measuring an exercise quantity or blood sugar) or environmental information (e.g., atmospheric pressure, humidity, or temperature).

According to an embodiment of the present disclosure, the application 970 may include an application (hereinafter referred to as "information exchanging application" for descriptive convenience) to support information exchange between the electronic device (e.g., an electronic device 701) and an external electronic device (e.g., an electronic device 702 or 704). The information exchanging application may include, for example, a notification relay application for transmitting specific information to the external electronic device, or a device management application for managing the external electronic device.

For example, the information exchanging application may include a function of transmitting notification information, which arises from other applications (e.g., applications for SMS/MMS, e-mail, health care, or environmental information), to an external electronic device (e.g., an electronic device 702 or 704). Additionally, the information exchanging application may receive, for example, notification information from an external electronic device and provide the notification information to a user.

The device management application may manage (e.g., install, delete, or update), for example, at least one function (e.g., turn-on/turn-off of an external electronic device itself (or a part of components) or adjustment of brightness (or resolution) of a display) of the external electronic device (e.g., an electronic device 702 or 704) which communicates with the electronic device, an application running in the external electronic device, or a service (e.g., a call service or a message service) provided from the external electronic device.

According to an embodiment of the present disclosure, the application 970 may include an application (e.g., a health care application), which is assigned in accordance with an attribute (e.g., an attribute of a mobile medical device as a kind of electronic device) of the external electronic device (e.g., an electronic device 702 or 704). According to an embodiment of the present disclosure, the application 970 may include an application, which is received from an external electronic device (e.g., a server 706 or an electronic device 702 or 704). According to an embodiment of the present disclosure, the application 970 may include a preloaded application or a third party application, which is downloadable from a server. The component titles of the program module 910 according to the embodiment of the present disclosure may be modifiable depending on kinds of OSs.

According to various embodiments of the present disclosure, at least a portion of the program module 910 may be implemented by software, firmware, hardware, or a combination of two or more thereof. At least a portion of the program module 910 may be implemented (e.g., executed), for example, by a processor (e.g., a processor 170 or 810). At least a portion of the program module 910 may include, for example, modules, programs, routines, sets of instructions, or processes, or the like for performing one or more functions.

The apparatuses and methods of the disclosure can be implemented in hardware, and in part as firmware or via the execution of software or computer code in conjunction with hardware that is stored on a non-transitory machine readable medium such as a CD ROM, a RAM, a floppy disk, a hard disk, or a magneto-optical disk, or computer code downloaded over a network originally stored on a remote recording medium or a non-transitory machine readable medium and stored on a local non-transitory recording medium for execution by hardware such as a processor, so that the methods described herein are loaded into hardware such as a general purpose computer, or a special processor or in programmable or dedicated hardware, such as an ASIC or FPGA. As would be understood by one having ordinary skill in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, a person having ordinary skill in the art understands and appreciates that a "processor", "microprocessor" "controller", or "control unit" constitute hardware in the claimed disclosure that contain circuitry that is configured for operation. Under the broadest reasonable interpretation, the appended claims constitute statutory subject matter in compliance with 35 U.S.C. § 101.

The definition of the terms "unit" or "module" as referred to herein may be understood as constituting hardware circuitry such as a CCD, CMOS, a processor or microprocessor configured for a certain desired functionality, or a communication module containing hardware such as transmitter, receiver or transceiver, or a non-transitory medium comprising machine executable code that is loaded into and executed by hardware for operation, in accordance with statutory subject matter under 35 U.S.C. § 101 and do not constitute software per se.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a portion of an apparatus (e.g., modules or functions thereof) or a method (e.g., operations) according to various embodiments of the present disclosure may be, for example, implemented by instructions stored in a computer-readable storage media in the form of a program module. The instruction, when executed by one or more processors (e.g., a processor 170), may cause the one or more processors to perform a function corresponding to the instruction. The computer-readable storage media, for example, may be the memory 130.

A module or a program module according to various embodiments of the present disclosure may include at least one of the above elements, or a portion of the above elements may be omitted, or additional other elements may be further included. Operations performed by a module, a program module, or other elements according to various embodiments of the present disclosure may be executed sequentially, in parallel, repeatedly, or in a heuristic method. Also, a portion of operations may be executed in different sequences, omitted, or other operations may be added.

According to various embodiments of the present disclosure, it may be possible to minimize current consumption and to calibrate a gyro sensor efficiently.

While the present disclosure has been shown and described with reference to various embodiments thereof, it will be understood by those having ordinary skill in the art that various changes in form and details may be made therein without departing from the spirit and scope of the present disclosure as defined by the appended claims and their equivalents.

What is claimed is:

1. An electronic device, comprising:
an acceleration sensor configured to measure an acceleration of the electronic device;
a gyro sensor configured to measure an angular velocity of the electronic device; and
a sensor control module configured to:
set a calibration period of the gyro sensor based on a state of the electronic device,
determine a stop state of the electronic device using the acceleration sensor in response to the set calibration period arrival, and
calibrate the gyro sensor if the electronic device is determined to be at a stop state.

2. The electronic device of claim 1, wherein the sensor control module determines whether the gyro sensor is activated and sets the calibration period of the gyro sensor to a specific time interval depending on whether the gyro sensor is activated or not.

3. The electronic device of claim 2, wherein the sensor control module sets the calibration period to a first time interval if the gyro sensor is at an inactive state and sets the calibration period to a second time interval, shorter than the first time interval, if the gyro sensor is at an active state.

4. The electronic device of claim 1, further comprising:
a battery,
wherein the sensor control module determines whether the battery is being charged and sets the calibration period of the gyro sensor to a specific time interval depending on whether the battery is being charged or not.

5. The electronic device of claim 4, wherein the sensor control module sets the calibration period to a first time interval if the battery is not being charged and sets the calibration period to a third time interval, shorter than the first time interval, if the battery is being charged.

6. The electronic device of claim 1, further comprising:
an input/output interface connected with an external device to transmit and receive data,
wherein the sensor control module determines whether a specific external device is connected to the input/output interface and sets the calibration period of the gyro sensor to a specific time interval depending on whether the specific external device is connected to the input/output interface or not.

7. The electronic device of claim 6, wherein the sensor control module sets the calibration period to a first time interval if the a specific external device is not connected to the input/output interface and sets the calibration period to a fourth time interval, shorter than the first time interval, if the a specific external device is connected to the input/output interface.

8. The electronic device of claim 1, wherein the electronic device comprises a plurality of states, each of which is given a priority, and wherein the sensor control module sets the calibration period of the gyro sensor based on the priorities of the states.

9. The electronic device of claim 1, wherein if the electronic device is determined to be at a stop state with the gyro sensor inactivated, the sensor control module is configured to activate the gyro sensor and to calibrate the gyro sensor.

10. The electronic device of claim 1, wherein the sensor control module sets the calibration period to a fifth time interval, longer than a current calibration period, if calibration of the gyro sensor is completed and sets the calibration period to a sixth time interval, shorter than the fifth time interval, if a specific time elapses without performing the calibration of the gyro sensor.

11. The electronic device of claim 1, further comprising:
a processor; and
a memory electrically connected with the processor,
wherein the sensor control module is configured to store a calibration result of the gyro sensor in the memory and to transmit the stored calibration result to the sensor control module if the electronic device is rebooted.

12. A method for calibrating a gyro sensor in an electronic device, the method comprising:
setting a calibration period of the gyro sensor based on a state of the electronic device;
determining a stop state of the electronic device using an acceleration sensor in response to the set calibration period arrival; and
calibrating the gyro sensor if the electronic device is determined to be at a stop state.

13. The method of claim 12, wherein the setting of the calibration period comprises:
determining whether the gyro sensor is activated; and
setting the calibration period of the gyro sensor to a specific time interval depending on whether the gyro sensor is activated or not.

14. The method of claim 13, wherein the setting of the calibration period comprises:
setting the calibration period to a first time interval if the gyro sensor is at an inactive state; and
setting the calibration period to a second time interval, shorter than the first time interval, if the gyro sensor is at an active state.

15. The method of claim 12, wherein the setting of the calibration period comprises:
determining whether a battery is being charged; and
setting the calibration period of the gyro sensor to a specific time interval depending on whether the battery is being charged or not.

16. The method of claim 15, wherein the setting of the calibration period comprises:
setting the calibration period to a first time interval if the battery is not being charged; and
setting the calibration period to a third time interval, shorter than the first time interval, if the battery is being charged.

17. The method of claim 12, wherein the setting of the calibration period comprises:
determining whether a specific external device is connected to an input/output interface; and
setting the calibration period of the gyro sensor to a specific time interval depending on whether the specific external device is connected to the input/output interface or not.

18. The method of claim 17, wherein the setting of the calibration period comprises:
setting the calibration period to a first time interval if the specific external device is not connected to the input/output interface; and
setting the calibration period to a fourth time interval, shorter than the first time interval, if the a specific external device is connected to an input/output interface.

19. The method of claim 12, wherein the electronic device comprises a plurality of states, each of which is given a priority, and
wherein the setting of the calibration period comprises:
setting the calibration period of the gyro sensor based on the priorities of the states, if at least a part of the plurality of states is duplicated.

20. The method of claim 12, further comprising:
activating the gyro sensor if the electronic device is determined to be at a stop state with the gyro sensor inactivated.

* * * * *